US009566899B2

(12) United States Patent
Foltin

(10) Patent No.: US 9,566,899 B2
(45) Date of Patent: Feb. 14, 2017

(54) METHOD AND CONTROL UNIT FOR SETTING AT LEAST ONE PARAMETER OF A DRIVER ASSISTANCE DEVICE OF A VEHICLE

(71) Applicant: Robert Bosch GmbH, Stuttgart (DE)

(72) Inventor: Johannes Ludwig Foltin, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/965,472

(22) Filed: Dec. 10, 2015

(65) Prior Publication Data

US 2016/0167565 A1 Jun. 16, 2016

(30) Foreign Application Priority Data

Dec. 11, 2014 (DE) .................. 10 2014 225 517

(51) Int. Cl.
*B60Q 1/26* (2006.01)
*B60Q 1/08* (2006.01)

(52) U.S. Cl.
CPC .......... *B60Q 1/085* (2013.01); *B60Q 2300/05* (2013.01); *B60Q 2300/322* (2013.01)

(58) Field of Classification Search
CPC ...................................... B60Q 1/44

USPC ............... 315/76, 77, 78, 79, 80, 82, 83
See application file for complete search history.

(56) References Cited

U.S. PATENT DOCUMENTS

| 2005/0116964 | A1* | 6/2005 | Kotake | G06T 15/205 345/629 |
| 2013/0051043 | A1* | 2/2013 | Ehlgen | B60Q 1/143 362/466 |
| 2014/0125227 | A1* | 5/2014 | Ehlgen | G06T 7/403 315/82 |
| 2014/0334168 | A1* | 11/2014 | Ehlgen | B60Q 1/085 362/466 |

\* cited by examiner

*Primary Examiner* — Minh D A
(74) *Attorney, Agent, or Firm* — Norton Rose Fulbright US LLP; Gerard Messina

(57) ABSTRACT

A method for setting at least one parameter of a driver assistance device of a vehicle includes reading in concealment data which represent at least one property of at least one concealment object situated adjacent to a roadway in a surroundings of the vehicle. The method also includes ascertaining a concealment-related visual range from the vehicle in an area of the surroundings situated in the forward travel direction ahead of the vehicle, using the concealment data. Finally, the method includes adapting the at least one parameter as a function of the concealment-related visual range.

11 Claims, 5 Drawing Sheets

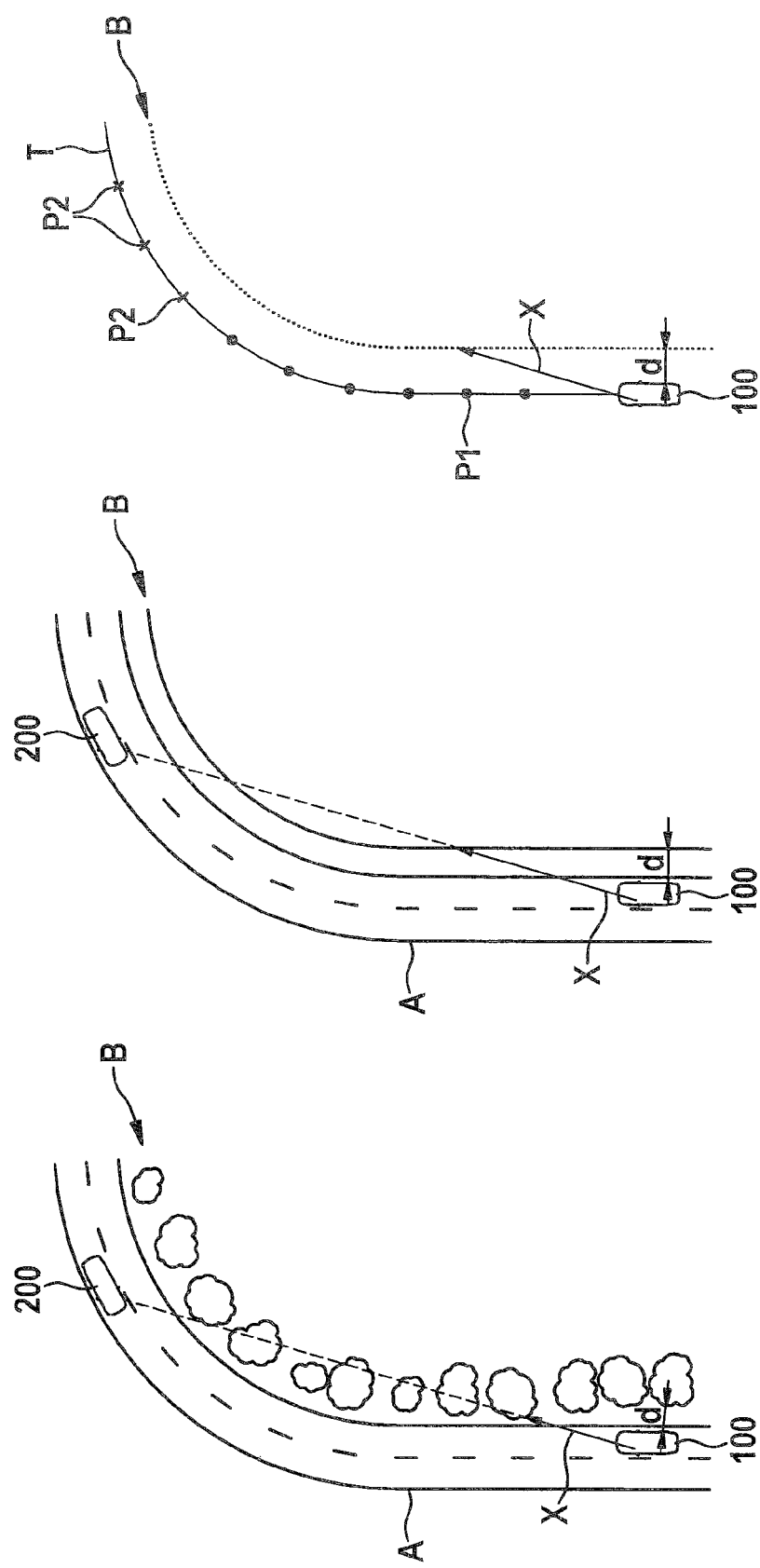

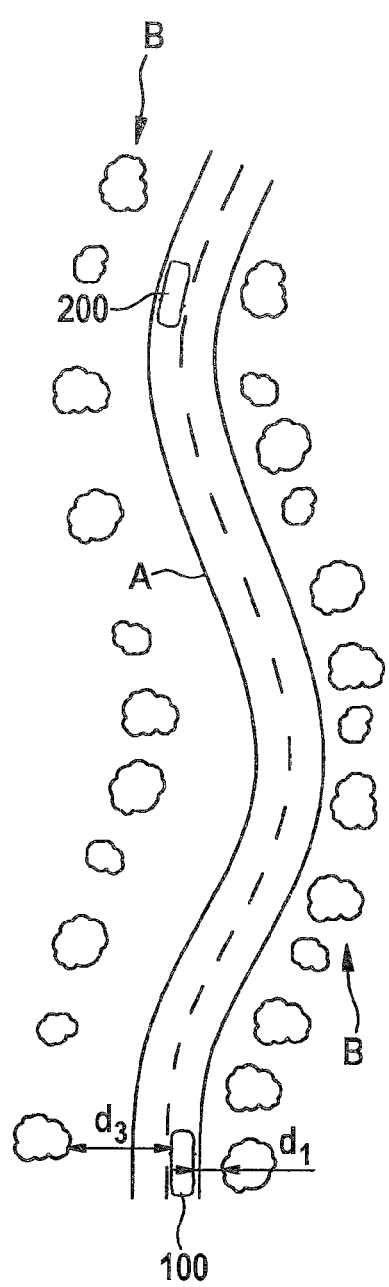
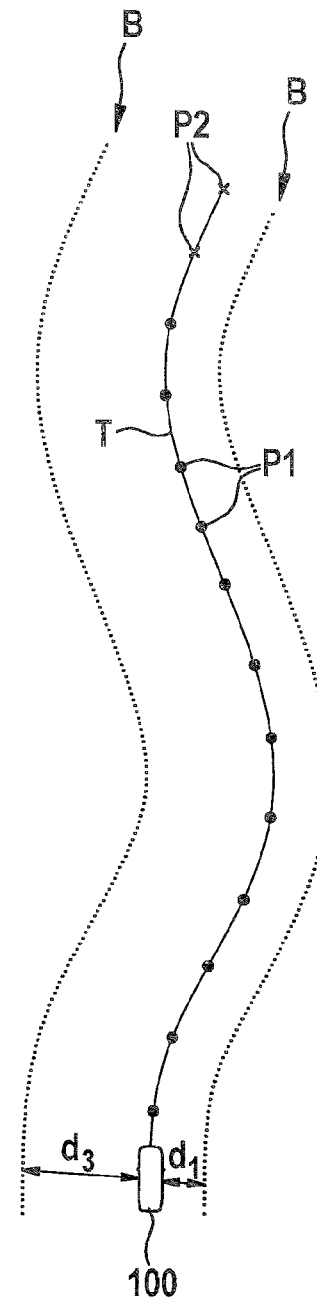
Fig. 4A                    Fig. 4B

METHOD AND CONTROL UNIT FOR SETTING AT LEAST ONE PARAMETER OF A DRIVER ASSISTANCE DEVICE OF A VEHICLE

RELATED APPLICATION INFORMATION

The present application claims priority to and the benefit of German patent application no. 10 2014 225 517.1, which was filed in Germany on Dec. 11, 2014, the disclosure of which is incorporated herein by reference.

FIELD OF THE INVENTION

The present invention relates to a method for setting at least one parameter of a driver assistance device of a vehicle, a corresponding control unit, and a corresponding computer program.

BACKGROUND INFORMATION

High beam assistance systems may adapt a light distribution to an environmental situation. A customary high beam assist (HBA) may automatically switch over between low-beam light and high-beam light, and adaptive systems may dynamically adapt the light distribution to a traffic situation. Adaptive systems include, for example, assistance systems such as adaptive high beam control (AHC), adaptive cut-off line (aCOL), or adaptive light-dark cutoff, which, similar to headlight leveling control, may raise a light-dark cutoff of a headlight just high enough so that other road users are not blinded. Continuous high beam control (CHC), or vertical cut-off line (vCOL), may generate a light distribution which is similar to high-beam light, whereby a shared shadow corridor is generatable around road users or groups of road users in order to shield them in a targeted manner. The so-called "matrix beam" or the so-called "pixel light" may generate independent shadow corridors for multiple road users. In addition, it is possible, based on information concerning the surroundings, to switch on specific static light distributions such as city light, expressway light, or rural roadway light.

SUMMARY OF THE INVENTION

Against this background, with the approach provided here, a method for setting at least one parameter of a driver assistance device of a vehicle, a control unit which uses this method, and lastly, a corresponding computer program, according to the main description herein are provided. Advantageous embodiments result from the respective further descriptions herein and the following description.

According to specific embodiments of the present invention, in particular a concealment-related visual range may be ascertained which is a function of the presence and the nature of a lateral concealment, i.e., a concealment in the border area of a roadway. Data regarding a lateral concealment by at least one concealment object or a "lateral concealment signal" may be used for computing a concealment-related possible visual range. For example, in the case of using a so-called high beam assist, turning the headlights back up or going from a low beam characteristic to a high beam characteristic of a light emission of vehicle headlights may be delayed when concealment objects, for example plants or the like, are situated on the roadside, and therefore an increase in the visual range by turning up the headlights would be too small. In other words, in particular based on surroundings information, a "lateral concealment signal" may be generated with which the visual range, and thus a setting of high beam assists or other systems, may be changed. For example, surroundings sensors may thus be utilized for determining concealment data or a "lateral concealment signal," it being possible to utilize the concealment data during ascertainment of the concealment-related visual range, and additionally or alternatively, to provide further functions or systems.

According to specific embodiments of the present invention, safety as well as comfort of a driver may advantageously be improved by situation-related or suitably parameterized assistance systems. In particular, in the case of a vehicle surroundings with concealment objects situated in particular on the roadside, comfort of the driver may be improved with regard to a light emission of vehicle headlights. By use of a signal for lateral concealment, for example caused by vegetation in a border area of the roadway, a visual range may be adapted to actually prevailing conditions, which may thus be reliably taken into account. Unlike the situation for ascertaining the visual range based solely on a roadway trajectory or taking solely the roadway trajectory into account, whereby concealments by hilltops and inadequate conditions may be taken into account during an object recognition, for example, crossing vehicles may be recognized as oncoming vehicles only a short distance away, according to specific embodiments of the present invention, lateral concealments and partial concealments, for example due to vegetation or building development, may thus be taken into account. In particular, concealment data regarding the presence of concealment objects or a lateral concealment in a border area of the roadway may be utilized for shifting or modifying a configuration of a high beam assist in order to be able to achieve comfort optimization as well as visual range optimization.

A method for setting at least one parameter of a driver assistance device of a vehicle is provided, the method including the following steps:

reading in concealment data which represent at least one property of at least one concealment object situated adjacent to a roadway in a surroundings of the vehicle;

ascertaining a concealment-related visual range from the vehicle in an area of the surroundings situated in the forward travel direction ahead of the vehicle, using the concealment data; and adapting the at least one parameter as a function of the concealment-related visual range.

The vehicle may be a road-bound vehicle, in particular a motor vehicle such as a passenger vehicle, a truck, a motorcycle, a commercial vehicle, or the like. The vehicle may be situated on a roadway or street. The driver assistance device may include a device for influencing a light emission, an acceleration, a steering angle, and/or safety systems of the vehicle. The concealment-related visual range may be a maximum visual range from the vehicle on the roadway or street, or in a section of the surroundings situated in the forward travel direction of the vehicle when the at least one concealment object is present. The concealment-related visual range may represent a distance from the vehicle to a point on a trajectory of the vehicle, which corresponds to a maximum visual range when the at least one concealment object is present. The at least one concealment object may be a vegetation object, in particular a bush, a tree, or the like. A plurality of concealment objects may represent a forest or a wooded area, for example. The at least one concealment object may be situated in a border area or along the roadway on which the vehicle is situated. In particular, the at least one concealment object may be situated in the forward travel direction of the vehicle in front of, and additionally or alternatively to the side, relative to the vehicle or the roadway.

In particular, the at least one parameter may represent a parameter for changing a characteristic of a light emission of at least one headlight of the vehicle from a first characteristic to a second characteristic. The characteristic of the light emission may represent a light distribution, a light intensity distribution, or the like. When the characteristic of the light emission is changed, the light emission may be modified discretely, quasi-continuously, or continuously. The first characteristic may have a lower light emission than the second characteristic. The first characteristic may be a low-beam light characteristic or a characteristic which is similar to low-beam light. The second characteristic may be a high-beam light characteristic or a characteristic which is similar to high-beam light. The first characteristic may be an output characteristic or instantaneously emitted characteristic, and the second characteristic may be a target characteristic of the light emission which is to be achieved by the change. An advantageous balance between an optimization for a small number of changes in the light emission, or a calm system response, and an optimization to the visual range may thus be achieved; for example in wooded areas or areas with lateral vegetation in cases in which in particular turning up the headlights would result in little or no increase in the visual range, turning up the headlights may be delayed or prevented. In particular an enhancement of a setting strategy or an operating mode for the light emission with regard to concealment objects may be achieved with little complexity. Thus, setting of the light emission in a comfort-optimized mode and also with regard to a suitable visual range may take place, whereby in particular an operation to turn up the headlights may be delayed when an ascertained concealment-related visual range would not justify turning up the headlights.

According to one specific embodiment, the method may include a step of determining the concealment data, using surroundings data which represent at least one property of the surroundings of the vehicle. A position, a pattern, an optical density, and additionally or alternatively, a distance of the at least one concealment object relative to a roadway, relative to the vehicle, and additionally or alternatively, relative to a trajectory of the vehicle, may be determined as the at least one property of the at least one concealment object in the step of determining. Such a specific embodiment offers the advantage that, using the concealment data determined in this way, in particular a concealment-related possible visual range may be ascertained particularly accurately and reliably, for example to suitably set the light emission of vehicle headlights.

Geodata, vehicle-related location data, and additionally or alternatively, at least one point and a distance of the at least one concealment object relative to the roadway, and additionally or alternatively, relative to the trajectory of the vehicle, may be determined in the step of determining as the position of the at least one concealment object. A continuous distance pattern along the roadway, and additionally or alternatively along the trajectory, a distance pattern extrapolated from a distance measured at a point, and additionally or alternatively, a default distance pattern, may be determined as the distance of the at least one concealment object relative to the roadway, and additionally or alternatively relative to the trajectory of the vehicle. Such a specific embodiment offers the advantage that exact location information concerning the at least one concealment object may be determined, whereby such a determination may take place using surroundings data from data sources which are available or evaluatable in each case, and which therefore may be flexibly adaptable to boundary conditions of a particular application.

The method may also include a step of receiving the surroundings data from at least one interface with a position detection unit, a vehicle camera, a data transmission unit, and additionally or alternatively, a surroundings detection unit of the vehicle. The data transmission unit may be configured for receiving the surroundings data from a unit external to the vehicle, and additionally or alternatively, from a unit internal to the vehicle, for example via a wireless data link from a remote data source. Such a specific embodiment offers the advantage that, depending on the application surroundings, options which are present for collecting data may be utilized in combination or separately in order to obtain reliable and accurate surroundings data as the basis for meaningful concealment data.

Geodata, navigation data, building development data, vegetation data, image data, and additionally or alternatively, distance data of the at least one concealment object relative to the roadway, relative to the vehicle, and additionally or alternatively, relative to a trajectory of the vehicle, may be received as the surroundings data in the step of receiving. Navigation data may include vegetation information which is evaluatable with regard to concealment objects. In addition, image data recorded with the aid of a stereo camera, for example, may be evaluatable, whereby concealment objects, in particular also concealment objects on the side of the roadway, for example bushes, houses, parked vehicles, and the like, may be recognized. Such a specific embodiment offers the advantage that in particular information or information sources which are already available may be utilized in order to adapt a visual range to a lateral concealment on the roadside, whereby an actually possible visual range in particular with regard to a light emission, a light assistant, etc. may be taken into account.

According to one specific embodiment, the concealment-related visual range may be ascertained in the step of ascertaining, using a position of the at least one concealment object and a trajectory of the vehicle. The position, and additionally or alternatively the trajectory, may be determined using geodata, navigation data, image data, travel data, or a combination thereof. Such a specific embodiment offers the advantage that a true-to-life, reliable, and exact maximum visual range, taking into account concealment objects which may potentially be present, may be ascertained in a particularly simple manner, for example with the aid of data of a position detection unit, a vehicle camera, and additionally or alternatively, a vehicle sensor system.

In addition, a waiting time period, and additionally or alternatively a controller time constant, may be adapted in the step of adapting. The waiting time period and additionally or alternatively the controller time constant may be set to a first value when the concealment-related visual range is smaller than a threshold value. In addition, the waiting time period and additionally or alternatively the controller time constant may be set to a second value when the concealment-related visual range is greater than the threshold value, the first value being greater than the second value. A threshold value comparison may thus be made with the ascertained concealment-related visual range in the step of adapting. The threshold value may represent a limiting value of one possible visual range, below which a change in the characteristic of the light emission away from the first characteristic, for example turning up the headlights, is to be delayed based on a cost-benefit comparison. For example, in dense vegetation, the concealment-related visual range, and thus an increase in the visual range which is achievable by turning up the headlights, may be small, so that a waiting time period for turning up the headlights may be extended by suitable adaptation. Such a specific embodiment offers the advantage that in situations in which an increase in the visual range by changing an instantaneously set characteristic of the light emission would be small, comfort for a driver may be increased and sufficient visibility may be maintained by a delayed, slower, or prevented change in the light emission. In particular, by extending a waiting time period which is applied up to an increase of an emitted quantity of light or up to an increase of a light distribution, in addition to the comfort for the driver, visibility quality may also be improved, since blinding by the at least one concealment object may be avoided.

The approach provided here also provides a control unit which is configured for carrying out, controlling, or implementing the steps of one variant of a method provided here in appropriate units. The underlying object of the present invention may also be quickly and efficiently achieved by this embodiment variant of the present invention.

In the present context, a control unit may be understood to mean an electrical device which processes sensor signals and outputs control and/or data signals as a function thereof. The control unit may include an interface which may have a hardware and/or software configuration. In a hardware configuration, the interfaces may be part of a so-called system ASIC, for example, which contains various functions of the control unit. However, it is also possible for the interfaces to be dedicated, integrated circuits, or to be at least partially made up of discrete components. In a software configuration, the interfaces may be software modules which are present on a microcontroller, for example, in addition to other software modules.

Also advantageous is a computer program product or a computer program having program code which may be stored on a machine-readable carrier or memory medium such as a semiconductor memory, a hard disk memory, or an optical memory, and used for carrying out, implementing, and/or controlling the steps of the method according to one of the specific embodiments described above, in particular when the program product or program is executed on a computer or a device.

An advantageous approach may thus be found for the mutually dependent objectives of visual range, blinding, and comfort. Rapid changes between light distributions may distract the driver, for which reason a delay in a switchover may be implemented. In adaptive systems, this could mean low pass filtering of an output signal or a slow controller configuration, for example. A high beam assist may be configured for delaying turning up the headlights when temporarily concealed road users result in immediate headlight dimming when they appear after the headlights have been turned up, and additionally or alternatively, for delaying headlight dimming and setting a minimum high-beam light duration. For acceptance and favorable assessment of a high beam assist by customers, not only smooth dynamics, for example avoiding discomfort from so-called flicker or erratic changes, but also the visual range, for example avoiding discomfort from insufficient stimulation or a too small minimum visual range, play a role. The visual range is essential for driving a vehicle, and likewise has an influence on the feeling of comfort or discomfort by the driver. The term "blinding" may refer to blinding of other road users. Blinding of the driver of the host vehicle may have different forms and components: As the result of so-called veiling luminance, physiological blinding may reduce a contrast of a perceived image, and thus, an actual recognizability distance or visual range. Psychological blinding may cause an unpleasant feeling in blinded persons, but has no effect on visual function, which is addressed by physiological blinding. Physiological blinding ("disability glare") may have an effect on the visual function. Physiological blinding and psychological blinding ("discomfort glare") may occur together, for example.

High beam assists may utilize information concerning the surroundings, for example continuous roadway illumination such as in a city or a structural separation on an expressway, as well as an existing traffic situation, for example preceding vehicles, oncoming vehicles, etc., in order to adapt a system response. For example, during travel past a single oncoming vehicle, the headlights may be turned back up more quickly in order to rapidly provide a driver with better visibility or a larger visual range due to a better light distribution, for example high-beam light instead of low-beam light. If a preceding vehicle suddenly disappears, the waiting time may be longer than for a vehicle traveling past, since the former vehicle could be temporarily concealed. Due to an extended waiting time, temporary turning up of the headlights may be prevented, since the other vehicle could immediately become visible again, for example during continued travel along a curve. A long waiting time may be set on roadways having a structural separation, since headlights of other vehicles may be infrequently visible, for example, and therefore longer time periods may be present between detection times. Due to a long waiting time, frequent switching over between low-beam light and high-beam light may be prevented and comfort may be increased, and blinding of other drivers, in particular truck drivers sitting in an elevated position, may be avoided. Temporary turning up of the headlights, which would result in a flickering sensation, may be avoided. Temporary turning up of the headlights may be recognized by a vehicle camera system, so that a minimum low-beam light duration may be set in order to calm a controller response of a high beam assist and increase comfort. In adaptive systems, which may generate quasi-continuous light distributions, a short waiting time may generally correspond to a small controller time constant, and thus, a rapid, dynamic response, and a longer waiting time may generally correspond to a large controller time constant, and thus, a slow, calm response.

The approach provided here is explained in greater detail below by way of example, with reference to the appended drawings.

BRIEF DESCRIPTION OF THE DRAWINGS

FIGS. 1, 2A, 2B, 2C, 3A, 3B, 4A and 4B show schematic illustrations of a vehicle which includes a control unit according to one exemplary embodiment of the present invention, in surroundings situations.

DETAILED DESCRIPTION

Figure 1:
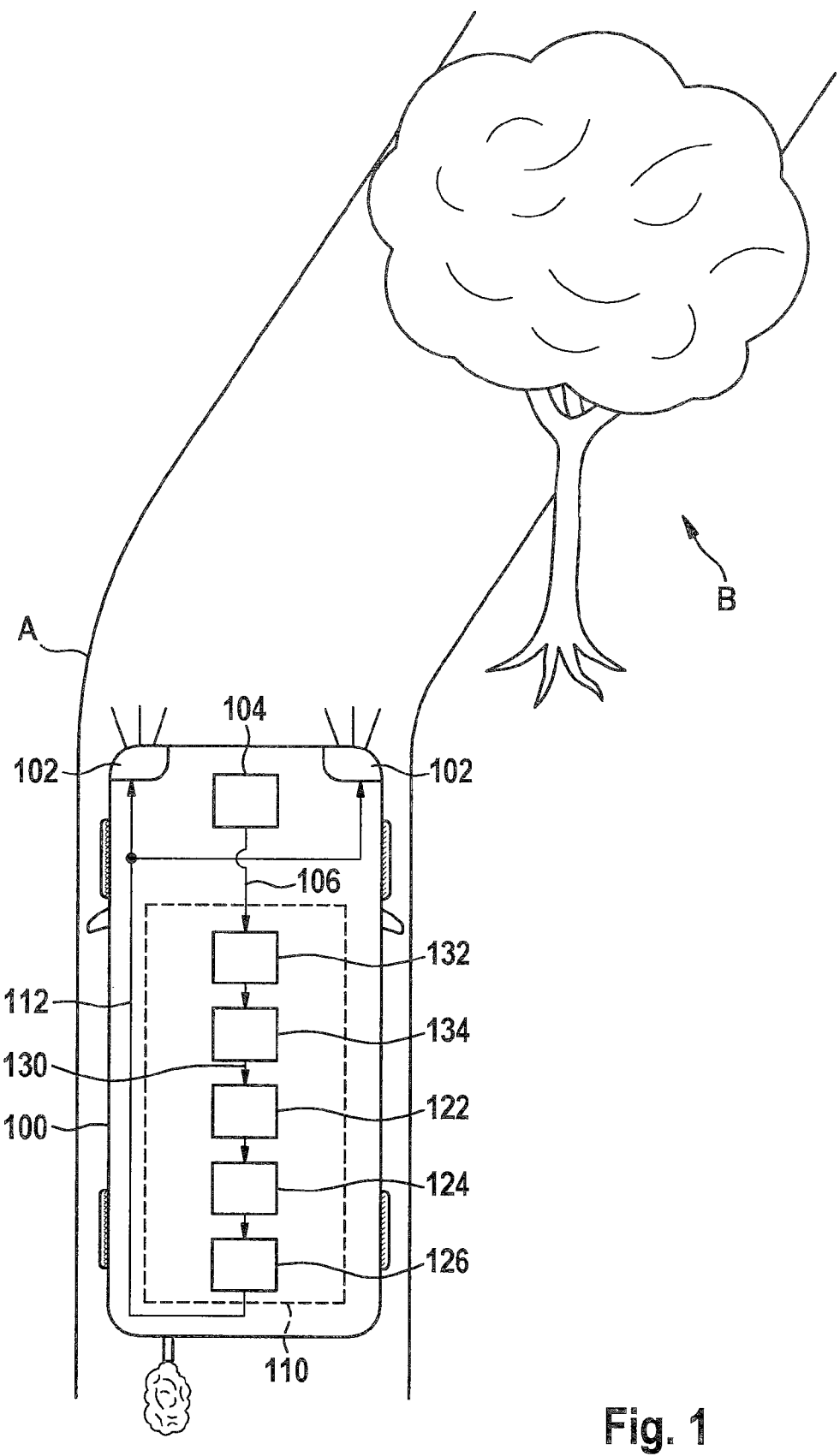

In the following description of advantageous exemplary embodiments of the present invention, identical or similar reference numerals are used for the elements having a similar action which are illustrated in the various figures, and a repeated description of these elements is dispensed with.

For the purpose of simplification and readability, exemplary embodiments are sometimes described in particular with regard to a classical high beam assist as the driver assistance device, use also being provided for adaptive systems, resulting in a change in system dynamics. In adaptive systems, a short waiting time period corresponds to a rapid system response, as the result of which, for example, a target light distribution or target characteristic is achieved more quickly, and a long waiting time period corresponds to a slower, more sluggish system response, as the result of which a target light distribution or target characteristic is achieved later or more slowly.

FIG. 1 shows a schematic illustration of a vehicle 100 which includes a control unit according to one exemplary embodiment of the present invention, in a surroundings or a surroundings situation. Vehicle 100 is a motor vehicle in the form of a passenger vehicle. Vehicle 100 is situated on a street or roadway A. In particular, roadway A has a pattern which deviates from a straight line, i.e., has a curve. By way of example, only one concealment object B in the form of a tree is situated in the area of an edge of roadway A, on the side of an inner radius of the curve in the progression of roadway A in the forward travel direction ahead of vehicle 100. The surroundings of vehicle 100 thus include roadway A and concealment object B.

Vehicle 100 shown in FIG. 1 includes two headlights 102. Headlights 102 are front headlights. Headlights 102 are controllable in order to generate a light emission. In the process, a characteristic of the light emission is changeable. For example, headlights 102 are controllable in order to generate a light emission which is changeable between a first characteristic and a second characteristic. The first characteristic is, for example, a low-beam light characteristic and the second characteristic is, for example, a high-beam light characteristic. According to the exemplary embodiment of the present invention illustrated in FIG. 1, the first characteristic represents an actual state, for example.

In addition, vehicle 100 has a surroundings data detection unit 104. Surroundings data detection unit 104 is configured for detecting surroundings data 106 which represent at least one property of the surroundings of the vehicle. For example, surroundings data detection unit 104 is configured as a position detection unit, a vehicle camera, a data transmission unit, a surroundings detection unit, e.g., a surroundings sensor, or a travel data detection unit. Optionally, vehicle 100 may include a plurality of surroundings data detection units 104 which may have different configurations. Surroundings data detection unit 104 is configured for providing surroundings data 106, in particular via an interface, for example a cable or a wireless data link. Surroundings data 106 are, for example, geodata, navigation data, building development data, vegetation data, image data, and additionally or alternatively, distance data of concealment object B relative to roadway A, relative to vehicle 100, and additionally or alternatively, relative to a trajectory of vehicle 100 on roadway A.

In addition, vehicle 100 includes the control unit, which is referred to below as a setting device 110. Setting device 110 or the control unit is configured for setting a characteristic of a light emission of headlights 102 of vehicle 100. Setting device 110 according to the exemplary embodiment of the present invention illustrated in FIG. 1 is configured for receiving and reading in surroundings data 106. In addition, setting device 110 is configured for outputting or providing a control signal 112 for controlling headlights 102. In particular, setting device 110 is configured for generating control signal 112, using surroundings data 106 or concealment data determined from surroundings data 106. Setting device 110 is configured for outputting control signal 112 to headlights 102 or to a control device, not illustrated in FIG. 1, for controlling headlights 102.

Setting device 110 or the control unit includes a reader unit 122, an ascertainment unit 124, and an adaptation unit 126. Reader unit 122 is configured for reading in concealment data 130, which represent at least one property of concealment object B situated adjacent to roadway A in the surroundings of vehicle 100. Concealment data 130 are determined or generated using surroundings data 106. In addition, reader unit 122 is configured for relaying concealment data 130 to ascertainment unit 124. Ascertainment unit 124 is configured for ascertaining a concealment-related visual range from vehicle 100 in an area of the surroundings situated in the forward travel direction ahead of vehicle 100, using concealment data 130. The concealment-related visual range represents a maximum possible visual range from vehicle 100 in an area of the surroundings situated in the forward travel direction ahead of vehicle 100, in the presence of concealment object B. In addition, ascertainment unit 124 is configured for relaying a piece of information which represents the concealment-related visual range to adaptation unit 126. Adaptation unit 126 is configured for adapting or modifying, as a function of the ascertained concealment-related visual range, at least one parameter for changing the characteristic of the light emission from a first characteristic to a second characteristic. The first characteristic of the light emission represents in particular a low-beam light characteristic, and the second characteristic of the light emission represents in particular a high-beam light characteristic. The at least one parameter includes, for example, a waiting time period for changing a characteristic or an instantaneously set characteristic of the light emission, in particular a waiting time period for turning up the headlights or switching over from a low-beam light characteristic to a high-beam light characteristic. The characteristic of the light emission is thus changeable as a function of the adapted waiting time period. Adaptation unit 126 is configured for generating control signal 112, using the adapted parameter, or for providing the adapted parameter to a unit for generating control signal 112.

According to one exemplary embodiment, ascertainment unit 124 is configured for ascertaining the concealment-related visual range, using a position of the at least one concealment object B and a trajectory of vehicle 100. According to one exemplary embodiment, adaptation unit 126 is configured for adapting a waiting time period, and additionally or alternatively, a controller time constant, as the parameter. In particular, adaptation unit 126 is configured for setting a long waiting time period or a large controller time constant when the concealment-related visual range is less than a threshold value, and for setting a short waiting time period or a small controller time constant when the concealment-related visual range is greater than the threshold value. Alternatively, ascertainment unit 124 may be configured for ascertaining the concealment-related visual range from vehicle 100 along a trajectory of vehicle 100, using concealment data 130.

Optionally, setting device 110 or the control unit also includes a receiving unit 132. Receiving unit 132 is configured for receiving surroundings data 106 from surroundings data detection unit 104. In addition, receiving unit 132 is configured for providing surroundings data 106. Setting device 110 optionally also includes a determination unit 134. Determination unit 134 is configured for accepting surroundings data 106 from receiving unit 132. In addition, determination unit 134 is configured for determining concealment data 130, using surroundings data 106. Determination unit 134 is also configured for relaying determined concealment data 130 to reader unit 122.

According to one exemplary embodiment, determination unit 134 is configured for determining a position, a pattern, an optical density, and additionally or alternatively, a distance of concealment object B relative to roadway A, relative to vehicle 100, and additionally or alternatively, relative to a trajectory of vehicle 100 as the at least one property of concealment object B. Optionally, for determining the position of concealment object B, determination unit 134 is configured for determining geodata, vehicle-related location data, and additionally or alternatively, at least one point and a distance of concealment object B relative to roadway A or relative to the trajectory of vehicle 100. Determination unit 134 is also configured for determining a continuous distance pattern along roadway A or the trajectory, a distance pattern extrapolated from a distance measured at a point, and additionally or alternatively, a default distance pattern, as the distance of concealment object B relative to roadway A or relative to the trajectory of vehicle 100.

Alternatively, receiving unit 132 may be configured for receiving surroundings data 106 from at least one interface with a position detection unit, a vehicle camera, a data transmission unit, or additionally or alternatively, a surroundings detection unit, of vehicle 100.

FIGS. 2A through 2C show schematic illustrations of vehicle 100 together with the control unit from FIG. 1 in a different surroundings or a different surroundings situation. FIGS. 2A through 2C may be considered in conjunction with a principle for ascertaining concealment data or a lateral concealment signal or a maximum concealment-related visual range for lateral vegetation.

In FIG. 2A, vehicle 100 or the host vehicle is shown on a roadway A which is shaped in a curve. A plurality of concealment objects B, for example in the form of trees or bushes, is situated along an inner radius of the curve in a border area next to roadway A. Each of concealment objects B is situated at a distance d from roadway A. Concealment objects B extend in a group along roadway A. Another vehicle 200 is also situated on roadway A. A concealment-related visual range X, or maximum visual range with vegetation, from vehicle 100 in the direction facing other vehicle 200 is depicted on a visual beam or a connecting line between vehicle 100 and other vehicle 200. Concealment-related visual range X extends from vehicle 100 in the direction of other vehicle 200 to a meeting point with the plurality of concealment objects B. According to the exemplary embodiment of the present invention illustrated in FIG. 2A, other vehicle 200 is not visible to vehicle 100. In other words, a visual range is limited to concealment-related visual range X. Other vehicle 200 approaching vehicle 100 or the host vehicle is thus hidden from the host vehicle by concealment objects B or bushes.

FIG. 2B illustrates vehicle 100 and the surroundings situation from FIG. 2A in a different way. Continuous lateral vegetation with concealment objects B is schematically replaced by position information of concealment objects B contained in surroundings data, and is symbolically depicted by a dotted line. Here as well, distance d, i.e., a lateral offset of concealment objects B, is depicted, and its parallel following of a pattern of roadway A is apparent. Other vehicle 200 is not visible to vehicle 100, since the visual beam on which concealment-related visual range X is plotted intersects the line which symbolically illustrates a vegetation area or concealment objects B.

FIG. 2C illustrates vehicle 100 and the surroundings situation from FIGS. 2A and 2B in a different way. The illustration in FIG. 2C corresponds to the illustration in FIG. 2B, with the exception that the other vehicle is omitted, and a trajectory T of vehicle 100 is depicted instead of roadway A. In other words, in FIG. 2C a street geometry or a geometry of roadway A is replaced by trajectory T. By iteratively passing through trajectory T and ascertaining an intersection point of straight lines from vehicle 100 to test points P1 and P2 on trajectory T with concealment objects B, it may be checked whether a particular test point under consideration is visible. Visible test points are denoted by reference character P1, and concealed test points are denoted by reference character P2. The setting device of vehicle 100 may thus be configured for interactively carrying out an iterative method or at least one step of a method. Concealment-related visual range X is situated, for example, on those straight lines which lead to a test point P2 which is hidden by concealment objects B and is closest to vehicle 100.

Figure 3B:
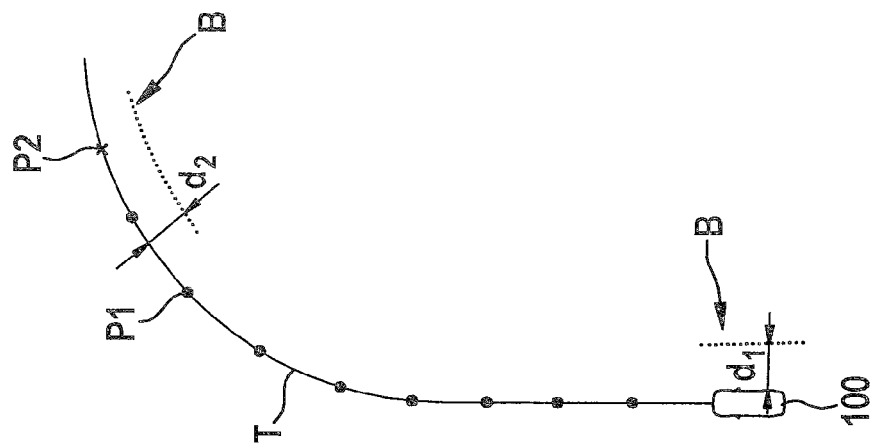
Figure 3A:
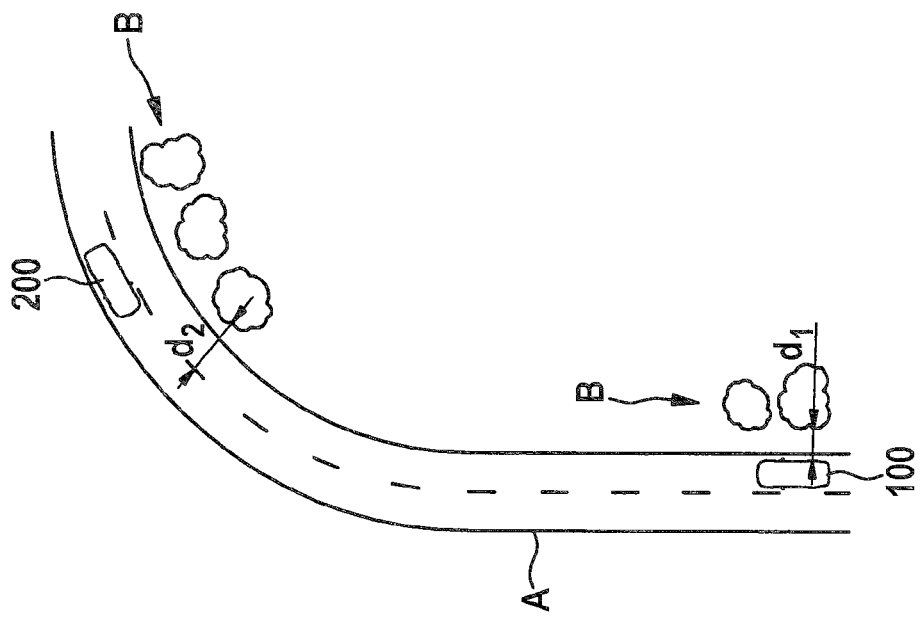

FIGS. 3A and 3B show schematic illustrations of vehicle 100 together with the control unit from FIG. 1 in a different surroundings or a different surroundings situation. The illustration in FIG. 3A corresponds to the illustration in FIG. 2A, with the exception that the visual beam and visual range are omitted in the illustration, and concealment objects B are situated in, for example, two groups situated at a distance along roadway A. A first group of concealment objects B is situated adjacent to vehicle 100, and a second group of concealment objects B is situated adjacent to other vehicle 200. A gap which is free of concealment objects B is situated between the first group of concealment objects B and the second group of concealment objects B. The first group of concealment objects B is situated at a first distance $d_1$ from roadway A or a trajectory of vehicle 100. The second group of concealment objects B is situated at a second distance $d_2$ from roadway A or a trajectory of vehicle 100. Vehicle 100 and the surroundings situation from FIG. 3A are illustrated in a different way in FIG. 3B. The illustration in FIG. 3B corresponds to the illustration in FIG. 3A, with the exception that the other vehicle is omitted, and a trajectory T of vehicle 100 is depicted instead of roadway A. The illustration in FIG. 3B is similar to the illustration in FIG. 2C.

With reference to FIGS. 3A and 3B, it is to be noted that, for example, a vegetation area in a border area of roadway A is not continuous; i.e., concealment objects B have different interspaces between adjacent concealment objects B. In particular, units for detecting surroundings data or the vegetation or concealment objects B may have different visual ranges or operating ranges, and may therefore supply different surroundings data and/or concealment data. Thus, for example, a stereo video camera may recognize concealment objects B at a close range, and vegetation or building development is detectable at a distant range with the aid of a position detection unit, for example a navigation system.

In a case such as in FIGS. 3A and 3B, it is apparent that the lateral concealment has gaps and thus is not continuous, since a maximum visual range could be erroneously shortened. Other vehicle 200 is still visible although concealment objects B are situated in the area of vehicle 100 and in the area of other vehicle 200. It is possible for the first group of concealment objects B and the second group of concealment objects B to be situated the same distance from roadway A or trajectory T, first distance $d_1$ being equal to second distance $d_2$. Alternatively, concealment objects B may also be situated at different distances from roadway A or trajectory T, first distance $d_1$ being different from second distance $d_2$. If only one of distances $d_1$ or $d_2$ is determinable, the undeterminable distance may be set to the value of the determinable distance. Optionally, concealment data which represent concealment objects B having an extension length along roadway A or trajectory T which is shorter than a minimum length may remain disregarded. In addition, an interruption or gap in a series of concealment objects B which is less than a minimum length may be arithmetically filled in for data processing in order to obtain a continuous lateral concealment. Vegetation which has a low optical density may remain disregarded, so that, if necessary, only vegetation having a minimum density is taken into account. The optical density of concealment objects B may be a function of a position of vehicle 100. Thus, an avenue with widely spaced trees has a lower density than when trees are practically side by side, and the branches overlap and obstruct vision.

FIGS. 4A and 4B show schematic illustrations of vehicle 100 together with the control unit from FIG. 1 in another surroundings or another surroundings situation. The illustration in FIG. 4A corresponds to the illustration in FIG. 3A, with the exception that roadway A has an essentially double S-shaped curve, and concealment objects B are situated along both sides of roadway A as an example. Concealment objects B extend continuously on both sides of roadway A between vehicle 100 and other vehicle 200. Thus, concealment objects B are situated on a first side of roadway A at a first distance $d_1$ from roadway A or trajectory of vehicle 100. Concealment objects B on the second side of roadway A are situated at a different distance $d_3$ from roadway A or a trajectory of vehicle 100. First distance $d_1$ and other distance $d_3$ are different from one another. Vehicle 100 and the surroundings situation from FIG. 4A are illustrated in a different way in FIG. 4B. The illustration in FIG. 4B corresponds to the illustration in FIG. 4A, with the exception that the other vehicle is omitted, and a trajectory T of vehicle 100 is depicted instead of roadway A. The illustration in FIG. 4B is similar to the illustration in FIG. 3B.

With reference to FIGS. 4A and 4B, it is to be noted that first distance $d_1$ is smaller than other distance $d_3$ by way of example. In the illustrated street geometry of roadway A having a double S-shaped curve, oncoming other vehicle 200 is visible due to this geometry. In a case in which other distance $d_3$ corresponds to first distance $d_1$ or is assumed to be equal to same, i.e., if the vegetation were closer to roadway A, other vehicle 200 would be concealed. This may be taken into account when ascertaining the maximum visual range with the aid of the setting device of vehicle 100 in order to not too greatly limit the ascertained maximum visual range. This means that for both lateral vegetation areas, their individual lateral distances should be ascertained. During the ascertainment, for example a range of a sensor for determining the lateral distance, for example an ultrasonic sensor, may be limited, or a sensor may possibly not be installed on one side of vehicle 100, whereby the presence of concealment objects B on both sides of roadway A would be ascertained with the aid of a vehicle camera, for example. In such a case, it is possible to ascertain the lateral distance from a measured lateral distance and a street geometry. For simplification, it may be assumed that, for example, a distance from the right edge of the roadway to the right lateral concealment is equal to a distance from the left edge of the roadway to the left lateral concealment.

Figure 5:
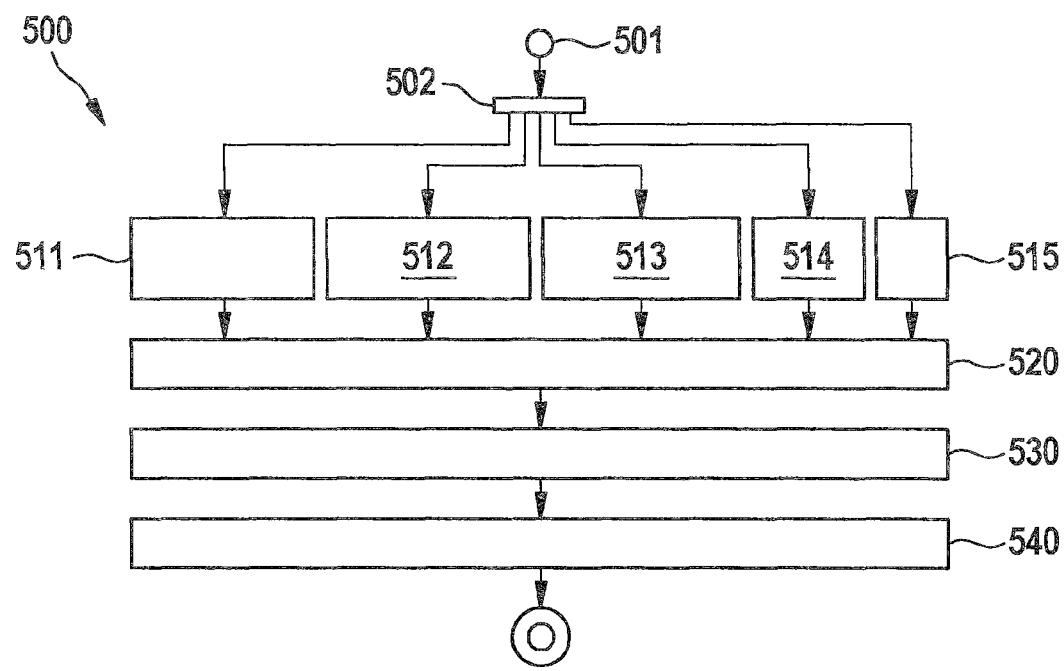
FIG. 5 shows a flow chart of a process according to one exemplary embodiment of the present invention.

FIG. 5 shows a flow chart of a process 500 according to one exemplary embodiment of the present invention. Process 500 is a process for setting a light emission of at least one headlight of a vehicle. Process 500 may be carried out in conjunction with a vehicle or a control unit from one of FIGS. 1 through 4 in order to advantageously set the light emission of at least one headlight of the vehicle.

From a starting point 501, process 500 arrives at a branch point 502. From branch block 502, process 500 branches, solely as an example, into five blocks 511, 512, 513, 514, and 515, connected in parallel, in which surroundings data are received. Navigation data are received in block 511, ultrasound data are received in block 512, depth information is ascertained in block 513, a vehicle trajectory is ascertained in block 514, and block 515 represents further data sources for surroundings data. From each of blocks 511, 512, 513, 514, and 515, process 500 arrives at a block 520 in which concealment data are determined, in particular the presence and geometry of lateral concealments being ascertained. In process 500, block 520 is followed by a block 530 in which the concealment-related visual range or a maximum visual range with lateral concealment is ascertained. Process 500 subsequently crosses over to a block 540 in which, for example, a waiting time or debouncing time is adapted, ascertained and set, or adapted to the concealment-related visual range. After block 540, process 500 terminates, or process 500 may be carried out anew or again.

In other words, when process 500 is carried out in block 520, it is ascertained, in particular from surroundings data of various surroundings sensors, whether at least one concealment object is situated at the side of roadway A, and at what distance. The concealment-related visual range is ascertained in block 530, based on a position of the at least one concealment object or the lateral concealment, and optionally the trajectory of the vehicle. The concealment data may represent the concealment-related visual range as well as geometry information, for example the position, pattern, and/or lateral offset of the at least one concealment object. The concealment data may optionally also be provided to further assistance systems and utilized by same to adapt a behavior. Use of the concealment-related visual range for setting the debouncing time of headlights represents only one example.

According to the exemplary embodiment of the present invention illustrated in FIG. 5, in particular navigation data, which contain vegetation information or information concerning a developed area, for example, may be utilized in process 500 as surroundings data, whereby such information supplements a regular detection range of vehicle sensors, and additionally or alternatively, surroundings data received from data sources external to the vehicle are used, so that an electronic horizon may thus be extended. With the aid of vehicle cameras and/or depth-measuring sensors, for example radar or LIDAR, lateral delimitations or concealment objects may be measured; for concealment objects directly next to the vehicle, for example ultrasonic sensors, which are utilized for measuring parking spaces or for passing assistance, for example, may be used. In addition to the presence of concealment objects, a lateral distance, an extension, and/or an optical density of concealment objects may likewise be ascertained from characteristic sensor information. The optical density of an avenue of trees or individual bushes as concealment objects is low, so that these may be expected to be partial concealments. Dense shrubbery or house walls as concealment objects have a high optical density, since light from the headlights of other vehicles is hardly visible, and the visual range is therefore more greatly limited. Navigation data may be utilized in process 500 to determine or estimate a vehicle trajectory at a great distance away. For example, vehicle cameras or camera systems may be used to ascertain a vehicle trajectory in a medium to near range in the forward travel direction ahead of the vehicle.

The presence of concealment objects is ascertained in block 520, using the surroundings data. A true position in space may be measured as the position of the concealment objects. For simplification and sparing of computing resources, a starting point of concealment objects as well as a lateral offset with respect to the vehicle trajectory may be ascertained. If the lateral offset cannot be ascertained over an entire distance of the presence or extent of the concealment objects, an instantaneously measured lateral offset with respect to the vehicle over the entire extent of the concealment objects along the roadway or vehicle trajectory may be assumed. If no lateral offset can be ascertained, a fixed offset, for example 5 meters, may be assumed. A concealment-related or maximum visual range which is possible for the predominant concealment is ascertained in block 530, based on the position data of the concealment objects as well as the trajectory of the vehicle.

In a high beam assist which evaluates the difference in visual range between two light distributions in order to adapt a waiting time for switching over, the concealment-related visual range, ascertained, for example, by carrying out process 500, may be utilized for computing the waiting time. The at least one concealment object may thus have a direct influence on the debouncing time: If at least one concealment object is present, a difference in visual range between different light distributions may possibly be small due to the fact that a maximum visual range is achieved earlier, so that a longer waiting time is set. If a lateral offset of the at least one concealment object is small, the visual range is small, so that a longer waiting time is set than for a large lateral offset, whereby wide visibility and a large difference in visual range may result in a short waiting time. However, this is strictly an example, since the concealment data may also be evaluated by other functions or units.

Figure 6:
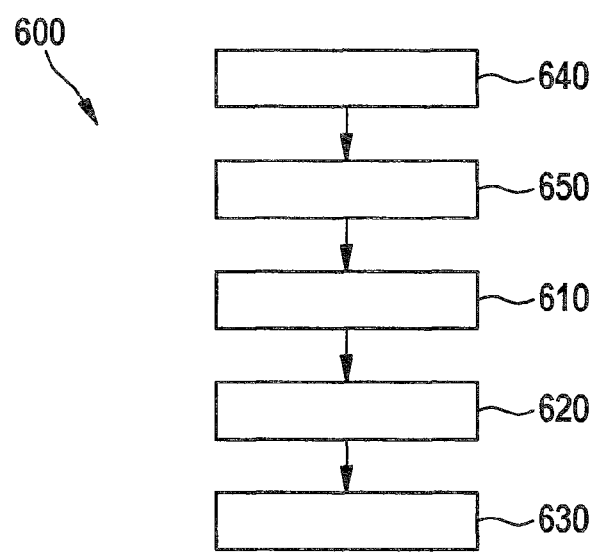
FIG. 6 shows a flow chart of a method according to one exemplary embodiment of the present invention.

FIG. 6 shows a flow chart of a method 600 according to one exemplary embodiment of the present invention. Method 600 is a method for setting a light emission of at least one headlight of a vehicle. Method 600 may be carried out in conjunction with a vehicle or a control unit from one of FIGS. 1 through 4 in order to advantageously set the light emission of at least one headlight of the vehicle. In addition, method 600 is similar to the process described for FIG. 5, and may be carried out in conjunction with same.

Method 600 includes a step 610 of reading in concealment data which represent at least one property of at least one concealment object situated adjacent to a roadway in a surroundings of the vehicle. A concealment-related visual range from the vehicle is ascertained from an area of the surroundings situated in the forward travel direction ahead of vehicle 100 in a subsequent step 620 of ascertaining, using the concealment data. At least one parameter for changing the characteristic of the light emission from a first characteristic to a second characteristic as a function of the concealment-related visual range is adapted or modified in a step 630 of adapting which follows step 620. Thus, by carrying out method 600, the light emission is settable as a function of the concealment-related visual range, and additionally or alternatively, as a function of at least one further property of the at least one concealment object.

According to one exemplary embodiment, prior to step 610 of reading in, method 600 includes a step 640 of receiving the surroundings data, followed by a step 650 of determining the concealment data. The surroundings data from at least one interface with a position detection unit, a vehicle camera, a data transmission unit, and additionally or alternatively, a surroundings detection unit, of the vehicle are received in step 640 of receiving. In addition, the concealment data, which represent at least one property of the surroundings of the vehicle, are determined in step 650 of determining, using surroundings data. For example, a position, a pattern, an optical density, and additionally or alternatively, a distance of the at least one concealment object relative to the roadway, relative to the vehicle or to a trajectory of the vehicle, is determined in step 650 of determining as the at least one property of the at least one concealment object.

The exemplary embodiments which are described, and shown in the figures, have been selected only as examples. Different exemplary embodiments may be combined with one another, either completely or with respect to individual features. In addition, one exemplary embodiment may be supplemented by features of another exemplary embodiment. Furthermore, the method steps provided here may be repeated, and carried out in a sequence different from that described.

If an exemplary embodiment includes an "and/or" linkage between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A method for setting at least one parameter of a driver assistance device of a vehicle, the method comprising:
    identifying at least one property of at least one concealment object situated adjacent to a roadway in a surroundings of the vehicle;
    ascertaining a concealment-related visual range from the vehicle in an area of the surroundings situated in the forward travel direction ahead of the vehicle, using the identified at least one property of the at least one concealment object; and
    adapting the at least one parameter as a function of the concealment-related visual range.

2. The method of claim 1, wherein the at least one parameter represents a parameter for changing a characteristic of a light emission of at least one headlight of the vehicle from a first characteristic to a second characteristic.

3. The method of claim 1, further comprising:
    determining the concealment data, using surroundings data which represent at least one property of the surroundings of the vehicle, a position, a pattern, an optical density, and/or a distance of the at least one concealment object relative to the roadway, relative to the vehicle, and/or relative to a trajectory of the vehicle being determined in the determining as the at least one property of the at least one concealment object.

4. The method of claim 3, wherein geodata, vehicle-related location data, and/or at least one point and a distance of the at least one concealment object relative to the roadway and/or relative to the trajectory of the vehicle is determined in the determining as the position of the at least one concealment object, a continuous distance pattern along the roadway and/or the trajectory, a distance pattern extrapolated from a distance measured at a point, and/or a default distance pattern being determined as the distance of the at least one concealment object relative to the roadway and/or relative to the trajectory of the vehicle.

5. The method of claim 3, further comprising:
receiving the surroundings data from at least one interface with a position detection unit, a vehicle camera, a data transmission unit, and/or a surroundings detection unit of the vehicle.

6. The method of claim 5, wherein geodata, navigation data, building development data, vegetation data, image data, and/or distance data of the at least one concealment object relative to the roadway, relative to the vehicle, and/or relative to a trajectory of the vehicle are received as the surroundings data in the receiving.

7. The method of claim 1, wherein the concealment-related visual range is ascertained in the ascertaining, using a position of the at least one concealment object and a trajectory of the vehicle.

8. The method of claim 1, wherein a waiting time period and/or a controller time constant is/are adapted in the adapting, the waiting time period and/or the controller time constant being set to a first value when the concealment-related visual range is smaller than a threshold value, and the waiting time period and/or the controller time constant being set to a second value when the concealment-related visual range is greater than the threshold value, the first value being greater than the second value.

9. A control unit for setting at least one parameter of a driver assistance device of a vehicle, comprising:
a reading arrangement to identify at least one property of at least one concealment object situated adjacent to a roadway in a surroundings of the vehicle;
an ascertaining arrangement to ascertain a concealment-related visual range from the vehicle in an area of the surroundings situated in the forward travel direction ahead of the vehicle, using the identified at least one property of the at least one concealment object; and
an adapting arrangement to adapt the at least one parameter as a function of the concealment-related visual range.

10. A computer readable medium having a computer program, which is executable by a processor, comprising:
a program code arrangement having program code for setting at least one parameter of a driver assistance device of a vehicle, by performing the following:
identifying at least one property of at least one concealment object situated adjacent to a roadway in a surroundings of the vehicle;
ascertaining a concealment-related visual range from the vehicle in an area of the surroundings situated in the forward travel direction ahead of the vehicle, using the identified at least one property of the at least one concealment object; and
adapting the at least one parameter as a function of the concealment-related visual range.

11. The computer readable medium of claim 10, wherein the at least one parameter represents a parameter for changing a characteristic of a light emission of at least one headlight of the vehicle from a first characteristic to a second characteristic.

* * * * *